US012660018B2

(12) United States Patent
Wu et al.

(10) Patent No.: US 12,660,018 B2
(45) Date of Patent: Jun. 16, 2026

(54) METHOD AND APPARATUS FOR WIRELESS COMMUNICATION

(71) Applicant: Lenovo (Beijing) Ltd., Beijing (CN)

(72) Inventors: Lianhai Wu, Chaoyang (CN); Ran Yue, Haidian District (CN); Zhennian Sun, Chaoyang District (CN); Jie Shi, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 558 days.

(21) Appl. No.: 18/001,455

(22) PCT Filed: Jun. 18, 2020

(86) PCT No.: PCT/CN2020/096808
§ 371 (c)(1),
(2) Date: Dec. 9, 2022

(87) PCT Pub. No.: WO2021/253324
PCT Pub. Date: Dec. 23, 2021

(65) Prior Publication Data
US 2023/0224986 A1      Jul. 13, 2023

(51) Int. Cl.
*H04W 76/14*          (2018.01)
*H04W 76/11*          (2018.01)
(52) U.S. Cl.
CPC ............ *H04W 76/14* (2018.02); *H04W 76/11* (2018.02)
(58) Field of Classification Search
None
See application file for complete search history.

(56) References Cited

U.S. PATENT DOCUMENTS

| | | | |
|---|---|---|---|
| 2020/0100308 A1* | 3/2020 | Lee | H04W 76/25 |
| 2020/0154290 A1 | 5/2020 | Lee et al. | |
| 2020/0178343 A1 | 6/2020 | Kim et al. | |
| 2020/0187298 A1 | 6/2020 | Chun | |
| 2021/0105787 A1* | 4/2021 | Park | H04W 72/542 |

(Continued)

FOREIGN PATENT DOCUMENTS

| | | |
|---|---|---|
| CN | 107852765 A | 3/2018 |
| CN | 108886827 A | 11/2018 |
| CN | 110099423 A | 8/2019 |

OTHER PUBLICATIONS

PCT/CN2020/096808 , "International Preliminary Report on Patentability", US Application No. PCT/CN2020/096808, Dec. 29, 2022, 6 pages.

(Continued)

*Primary Examiner* — Kouroush Mohebbi
(74) *Attorney, Agent, or Firm* — FIG. 1 Patents

(57) ABSTRACT

Embodiments of the present disclosure relate to methods and apparatuses for wireless communication. According to some embodiments of the disclosure, a method may include: transmitting, at a first user equipment (UE), a radio resource control (RRC) reconfiguration sidelink via relay message on a sidelink between the first UE and a second UE; and starting a timer associated with the RRC reconfiguration sidelink via relay message. The second UE may act as a relay node and may transfer the received message to a destination UE or base station. The destination UE or base station may response to the first UE before a timer expires.

20 Claims, 7 Drawing Sheets

(56) References Cited

U.S. PATENT DOCUMENTS

2021/0243829 A1 *  8/2021  Paladugu .............. H04W 80/02
2023/0363035 A1 *  11/2023  Zhang ................ H04B 7/15507

OTHER PUBLICATIONS

PCT/CN2020/096808 , "International Search Report and Written Opinion", PCT Application No. PCT/CN2020/096808, Mar. 17, 2021, 7 pages.
Philips International B.V. , "UE-to-Network Relay discovery and handling of PDU session parameters with CN based relay selection", SA WG2 Meeting #139e, S2-2004201, Elbonia [retrieved Dec. 13, 2022]. Retrieved from the Internet <https://www.3gpp.org/ftp/tsg_sa/WG2_Arch/TSGS2_139e_Electronic/Inbox/Drafts>., Jun. 2020, 7 Pages.
202080102203.5 , "Foreign Office Action", US Application No. 202080102203.5, Jun. 4, 2024, 23 pages.
202080102203.5 , "Foreign Office Action", CN Application No. 202080102203.5, Sep. 30, 2024, 21 pages.
20941245.1 , "Extended European Search Report", EP Application No. 20941245.1, Jan. 5, 2024, 10 pages.
Huawei , et al., "Update of Solution 6.5.2 to align with RAN2 and Solution 6.1.5", SA WG2 Meeting #122-bis, S2-176344, Sophia Antipolis, France, Aug. 2017, 7 pages.

* cited by examiner

METHOD AND APPARATUS FOR WIRELESS COMMUNICATION

TECHNICAL FIELD

Embodiments of the present application generally relate to wireless communication technology, especially to coverage extension based on sidelink communication in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In the above wireless communication systems, a user equipment (UE) may communicate with another UE via a data path supported by an operator's network, e.g., a cellular or a Wi-Fi network infrastructure. The data path supported by the operator's network may include a base station (BS) and multiple gateways.

Some wireless communication systems may support sidelink (SL) communications, in which devices (e.g., UEs) that are relatively close to each other may communicate with one another directly via a SL, rather than being linked through the BS. The term "SL" may refer to a direct radio link established for communicating among devices, as opposed to communicating via the cellular infrastructure (uplink and downlink) as discussed above. The term "SL" may also be referred to as a sidelink communication link.

Currently, proximity reachability based on sidelink communications is limited to single-hop. A Relaying function based on a sidelink is not supported. The industry desires a technology for supporting a relaying function based on a sidelink.

SUMMARY

According to some embodiments of the present application, a method may include: transmitting, at a first user equipment (UE), a radio resource control (RRC) reconfiguration sidelink via relay message on a sidelink between the first UE and a second UE; and starting a timer associated with the RRC reconfiguration sidelink via relay message.

According to some other embodiments of the present application, a method may include receiving, at a second user equipment (UE), a radio resource control (RRC) reconfiguration sidelink via relay message on a sidelink between a first UE and the second UE, wherein a destination of the RRC reconfiguration sidelink via relay message is a third UE.

According to some other embodiments of the present application, a method may include receiving, at a third user equipment (UE), a radio resource control (RRC) reconfiguration sidelink via relay message on a sidelink between the third UE and a second UE, wherein a destination of the RRC reconfiguration sidelink via relay message is the third UE.

According to some other embodiments of the present application, a method may include transmitting, at a first user equipment (UE), a radio resource control (RRC) setup request message on a sidelink, wherein the RRC setup request message comprises an identity of the first UE.

According to some other embodiments of the present application, a method may include receiving, at a second user equipment (UE), a first radio resource control (RRC) setup request message on a sidelink, wherein the first RRC setup request message comprises an identity of a first UE.

According to some other embodiments of the present application, a method may include receiving, at a base station (BS) from a second user equipment (UE), a radio resource control (RRC) setup request message comprising an identity of a first UE.

Some embodiments of the present application also provide an apparatus, include: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide technical solutions for supporting the relaying function based on a sidelink, and can facilitate and improve the implementation of 5G NR technology.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
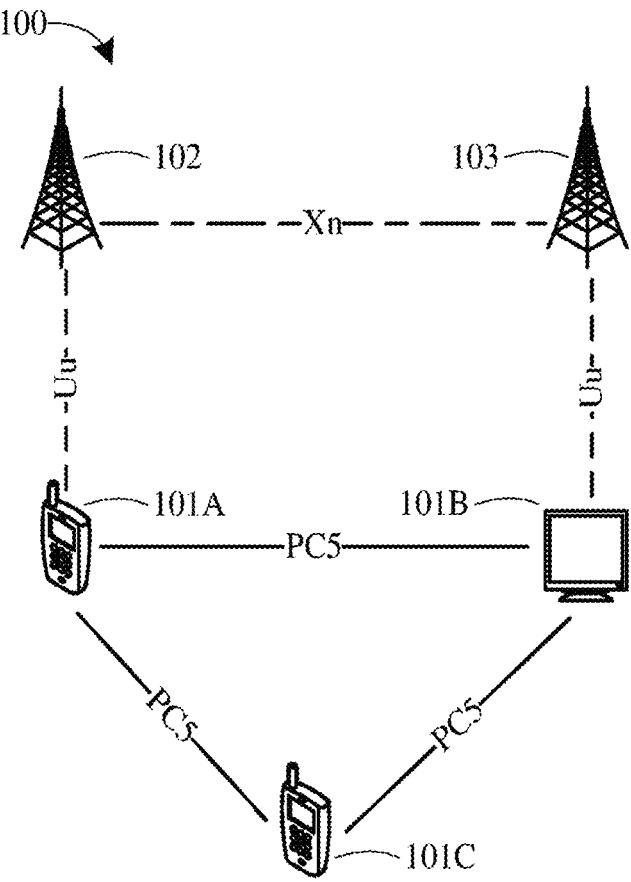
FIG. 1 illustrates a schematic diagram of a wireless communication system in accordance with some embodiments of the present application.

FIG. 1 illustrates a schematic diagram of a wireless communication system 100 in accordance with some embodiments of the present disclosure.

As shown in FIG. 1, the wireless communication system 100 may support sidelink communications. In the context of the present application, sidelink communications may be categorized according to the wireless communication technologies adopted. For example, NR sidelink communications (specified in 3GPP specification TS 38.311) may refer to access stratum (AS) functionality enabling at least vehicle-to-everything (V2X) communications as defined in 3GPP specification TS 23.287 between neighboring UEs, using NR technology but not traversing any network node. V2X sidelink communications (specified in 3GPP specification TS 36.311) may refer to AS functionality enabling V2X communications as defined in 3GPP specification TS 23.285 between neighboring UEs, using evolved-universal mobile telecommunication system (UMTS) terrestrial radio access (UTRA) (E-UTRA) technology, but not traversing any network node. However, if being not specified, "sidelink communications" may refer to NR sidelink communications, V2X sidelink communications, or any sidelink communications adopting other wireless communication technologies.

Referring to FIG. 1, the wireless communication system 100 may include some base stations (e.g., BS 102 and BS 103) and some UEs (e.g., UE 101A, UE 101B, and UE 101C). Although a specific number of UEs and BSs are depicted in FIG. 1, it is contemplated that any number of UEs and BSs may be included in the wireless communication system 100.

The UEs and the BSs may support communication based on, for example, 3G, long-term evolution (LTE), LTE-advanced (LTE-A), new radio (NR), or other suitable protocol(s). In some embodiments of the present disclosure, a BS may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

The UE 101A and UE 101B may be in-coverage. For example, as shown in FIG. 1, the UE 101A may be within the coverage of BS 102, and the UE 101B may be within the coverage of BS 103. The UE 101C may be out-of-coverage. For example, as shown in FIG. 1, the UE 101C may be outside the coverage of any BSs, for example, both the BS 102 and BS 103. The UE 101A and UE 101B may respectively connect to the BS 102 and BS 103 via a network interface, for example, the Uu interface as specified in 3GPP standard documents. The control plane protocol stack in the Uu interface may include a radio resource control (RRC) layer, which may be referred to as a Uu-RRC. The BS 102 and BS 103 may be connected to each other via a network interface, for example, the Xn interface as specified in 3GPP standard documents. The UE 101A, UE 101B, and UE 101C may be connected to each other respectively via, for example, a PC5 interface as specified in 3GPP standard documents. The control plane protocol stack in the PC5 interface may include a radio resource control (RRC) layer, which may be referred to as PC5-RRC.

Support for V2X services via the PC5 interface can be provided by, for example, NR sidelink communication or V2X sidelink communication. NR sidelink communication can support one of the following three types of transmission modes for a pair of a source Layer-2 identity and a destination Layer-2 identity: unicast transmission, groupcast transmission, and broadcast transmission. Sidelink communication transmission and reception over the PC5 interface are supported when the UE is either in-coverage or out-of-coverage. For example, the UE 101A, which is within the coverage of the BS 102, can perform sidelink transmission and reception (e.g., sidelink unicast transmission, sidelink groupcast transmission, or sidelink broadcast transmission) over a PC5 interface. The UE 101C, which is outside the coverage of both the BS 102 and BS 103, can also perform sidelink transmission and reception over a PC5 interface.

A UE which supports sidelink communication or V2X communication may be referred to as a V2X UE. A V2X UE may be a cell phone, a vehicle, a roadmap device, a computer, a laptop, an IoT (internet of things) device or other type of device in accordance with some other embodiments of the present application.

A V2X UE can operate in different modes. At least two sidelink resource allocation modes are defined for sidelink communication. For example, mode 1 may refer to the situation where a base station schedules sidelink resource(s) to be used by the UE for sidelink transmission(s), and mode 2 may refer to the situation where a UE determines sidelink transmission resource(s) and timing within a resource pool. The resource pool may be configured by a base station or network, or may be pre-configured according to a standard. In mode 2, the base station may not need to dynamically schedule the sidelink resources for the UE, and the UE may determine the sidelink transmission resources and timing in the resource pool based on, for example, a measurement result and a sensing result.

In mode 1, a UE may need to be in an RRC_CONNECTED state in order to transmit data. A base station can dynamically schedule resources to the UE via a physical downlink control channel (PDCCH) for NR sidelink communication. In addition, the base station can allocate sidelink resources to the UE with two types of configured sidelink grants (e.g., sidelink resources):

sidelink configured grant type 1 (or type 1): the RRC directly provides the configured sidelink grant only for NR sidelink communication; and sidelink configured grant type 2 (or type 2): the RRC defines the periodicity of the configured sidelink grant while the PDCCH can either signal and activate the configured sidelink grant, or deactivate it.

For a UE performing NR sidelink communication, there can be more than one configured sidelink grant activated at a time on the carrier configured for sidelink transmission.

In mode 2, a UE can transmit data when the UE is either in-coverage or out-of-coverage. The UE may autonomously select a sidelink grant from a resource pool provided by system information (e.g., system information block (SIB)) or dedicated signaling while the UE is inside the coverage of a BS or a pre-configured resource pool while the UE is outside the coverage of any BS.

For NR sidelink communication, the resource pool can be provided for a given validity area where the UE does not need to acquire a new resource pool while moving within the validity area, at least when this pool is provided by an SIB (for example, a reuse valid area of an NR SIB). The UE may be allowed to temporarily use the UE autonomous resource selection method with random selection for sidelink transmission based on configuration of the exceptional transmission resource pool as specified in 3GPP specification TS 38.331.

In some embodiments of the present application, the wireless communication system 100 may support a multi-radio dual connectivity (MR-DC) operation. For example, UE 101A may connect to both BS 102 which functions as a master node (MN) and another BS (not shown in FIG. 1) which functions as a secondary node (SN). The MN (e.g., BS 102) and SN (e.g., the another BS) may be connected to each other via a network interface, for example, the Xn interface. The MN (e.g., BS 102) may be connected to the core network via a network interface (not shown in FIG. 1). In some embodiments of the present application, the SN (e.g., the another BS) may also be connected to the core network. The UE 101A may be configured to utilize resources provided by the MN (e.g., BS 102) and SN (e.g., the another BS) to perform data transmission, signaling transmission, or both.

The MN (e.g., BS 102) may refer to a radio access node that provides a control plane connection to the core network. In some embodiments of the present application, in the E-UTRA-NR DC (EN-DC) scenario, the MN (e.g., BS 102) may be an eNB. In some other embodiments of the present application, in the next generation E-UTRA-NR DC (NGEN-DC) scenario, the MN (e.g., BS 102) may be an ng-eNB. In yet other embodiments of the present application, in the NR-DC scenario or the NR-E-UTRA DC (NE-DC) scenario, the MN (e.g., BS 102) may be a gNB.

An MN may be associated with a master cell group (MCG). An MCG may refer to a group of serving cells associated with the MN, and may include a primary cell (PCell) and optionally one or more secondary cells (SCells). The PCell may provide a control plane connection to a UE (e.g., UE 101A).

The SN (e.g., the another BS) may refer to a radio access node without a control plane connection to the core network but providing additional resources to the UE 101A. In some embodiments of the present application, in the EN-DC scenario, the SN may be an en-gNB. In some other embodiments of the present application, in the NE-DC scenario, the SN may be an ng-eNB. In yet other embodiments of the present application, in the NR-DC scenario or the NGEN-DC scenario, the SN may be a gNB.

An SN may be associated with a secondary cell group (SCG). An SCG may refer to a group of serving cells associated with the SN, and may include a primary secondary cell (PSCell) and optionally one or more secondary cells (SCells).

In some embodiments of the present application, the UE 101A may be configured to monitor the MCG of the MN and may detect MCG failures. In some embodiments of the present disclosure, the UE 101A may initiate a MCG recovery procedure (e.g., a fast MCG link recovery procedure) to inform an RLF on the MCG to the MN via the SCG link (e.g., the SN), such that the UE 101A in an RRC_CONNECTED state may initiate the fast MCG link recovery procedure to quickly continue the RRC connection without performing a re-establishment procedure. In some embodiments of the present application, the UE 101A may be configured with a split signaling radio bearer 3 (SRB3) to report the MCG failure information when a RLF on the MCG happens.

Figure 2:
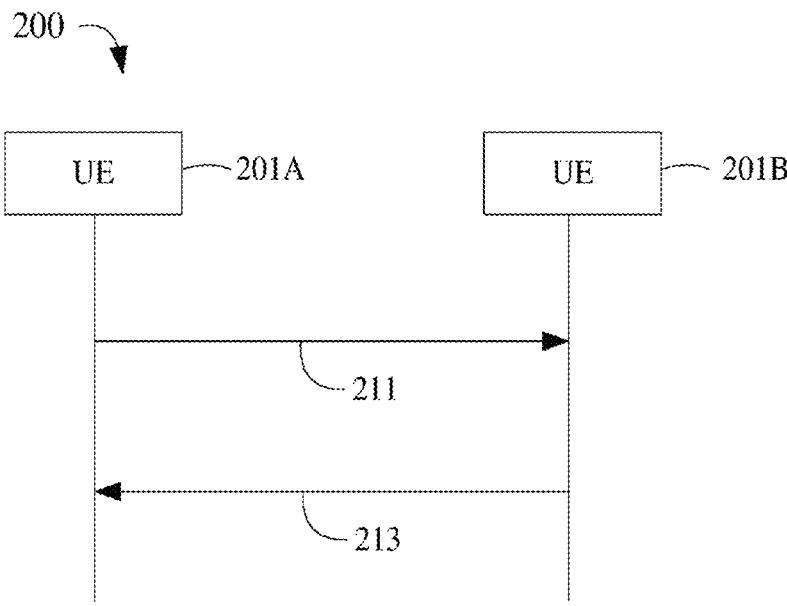
FIG. 2 illustrates an exemplary flowchart of a sidelink RRC reconfiguration procedure in accordance with some embodiments of the present application.

FIG. 2 illustrates an exemplary flowchart of a sidelink RRC reconfiguration procedure 200 in accordance with some embodiments of the present application.

The purpose of the sidelink RRC reconfiguration procedure is to modify a PC5-RRC connection. In some examples, a UE may perform such procedure to establish, modify, or release a sidelink data radio bearer (DRBs). In some examples, a UE may perform such procedure to configure an NR sidelink measurement and reporting. In some examples, a UE may perform such procedure to configure sidelink channel state information (CSI) reference signal resources.

Referring to FIG. 2, UE 201A may initiate a sidelink RRC reconfiguration procedure, and may transmit an RRC reconfiguration sidelink message to a peer UE (e.g., UE 201B) in step 211. A peer UE of the UE 201A refers to a UE that is or will be in sidelink communication with UE 201A. UE 201A may initiate the sidelink RRC reconfiguration procedure, for example, in one of the following cases:

the release of the sidelink DRBs associated with a peer UE;

the establishment of the sidelink DRBs associated with a peer UE;

the modification of the parameters in the sidelink radio bearer (SLRB) configuration (e.g., SLRB-Config as specified in 3GPP standard documents) of the sidelink DRBs associated with a peer UE;

the configuration of a peer UE to perform an NR sidelink measurement and report; and the configuration of the sidelink CSI reference signal resources.

After receiving the RRC reconfiguration sidelink message, UE 201B may perform corresponding operations, for example, releasing or establishing sidelink DRBs between UE 201A and UE 201B. In the case that UE 201B has successfully performed the operations, UE 201B may transmit an RRC reconfiguration complete sidelink message to UE 201A in step 213. Otherwise, in the case that UE 201B has failed to perform the operations, UE 201B may transmit an RRC reconfiguration failure sidelink message to UE 201A in step 213.

In some embodiments of the present disclosure, in response to transmitting an RRC reconfiguration sidelink message, UE 201A may start a timer (e.g., timer T400 as specified in 3GPP standard documents) to control the sidelink RRC reconfiguration procedure. UE 201A may stop the timer in response to receiving a response to the RRC reconfiguration sidelink message from UE 201B. In response to the expiry of the timer or the reception of the RRC reconfiguration failure sidelink message, UE 201A may consider that a failure has occurred on the radio link.

Currently, proximity reachability based on sidelink communication is limited to single-hop via, for example, E-UTRA-based sidelink technology or NR-based sidelink technology. A relaying function based on a sidelink is not supported. For example, the reachability to a BS is necessary for UEs to reach server(s) in a packet data network (PDN). In communication systems adopting, for example, 5G NR technology, although an out-of-coverage UE may establish a sidelink with an in-coverage UE, the out-of-coverage UE cannot access the serving BS of the in-coverage UE via the in-coverage UE, and thus cannot reach the serving BS of the in-coverage UE.

Moreover, a UE (second UE) can establish a sidelink with two or more UEs (e.g., first and third UEs), but the first UE and the third UE cannot communicate with each other via the second UE.

Accordingly, the coverage of the single-hop sidelink may be limited. Embodiments of the present application provide solutions for extending the coverage of sidelink communications.

In some embodiments of the present application, a UE-to-network relay is supported. For example, an in-coverage UE in communication with an out-of-coverage UE may function as a relay UE between the serving BS of the in-coverage UE and the out-of-coverage UE. In some embodiments of the present application, a UE-to-UE relay is supported. For example, a UE in communication with two or more UEs (e.g., first and third UEs) may function as a relay UE, such that the first UE may communicate with the third UE via the relay UE. More details on embodiments of the present application will be illustrated in the following text in combination with the appended drawings.

Figure 3:
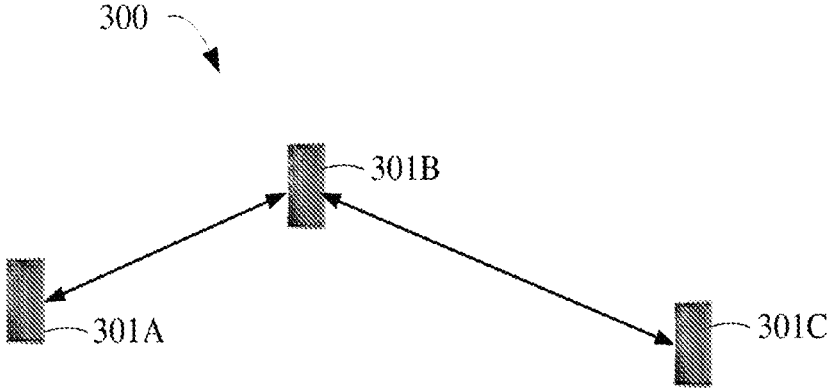
FIG. 3 illustrates a schematic diagram of a wireless communication system in accordance with some embodiments of the present application.

FIG. 3 illustrates a schematic diagram of a wireless communication system 300 in accordance with some embodiments of the present application.

As shown in FIG. 3, the wireless communication system 300 may include some UEs (e.g., UE 301A, UE 301B, and UE 301C). The wireless communication system 300 may also include some base stations (not shown in FIG. 3). Although a specific number of UEs are depicted in FIG. 3, it is contemplated that any number of UEs may be included in the wireless communication system 300.

Referring to FIG. 3, each of the UE 301A, UE 301B, and UE 301C may be in-coverage or out-of-coverage. In some examples, each of UE 301A, UE 301B, and UE 301C may function as a UE (e.g., UE 101A, UE 101B, or UE 101C) shown in FIG. 1.

The wireless communication system 300 may support sidelink communications. For example, UE 301B may be in sidelink communication with UE 301A and UE 301C, respectively. In some embodiments of the present disclosure, UE 301A may initiate a procedure for establishing connection with UE 301C via UE 301B (i.e., a UE-to-UE relay). More details on such procedure will be illustrated in the following text. After such procedure, UE 301A may communicate with UE 301C via the relay UE, i.e., UE 301B. In some embodiments of the present application, UE 301A may perform unicast transmission with UE 301C via UE 301B. In some embodiments of the present application, UE 301A may perform groupcast transmission and broadcast transmission via UE 301B.

In the case of unicast transmission between a pair of UEs (e.g., UE 301A and UE 301C or UE 301A and UE 301B), for each PC5-RRC connection, one sidelink SRB may be used to transmit PC5 signaling (PC5-S) messages before PC5-S security has been established. Moreover, one sidelink SRB may be used to transmit the PC5-S messages to establish PC5-S security. In addition, after the PC5-S security has been established, one sidelink SRB may be used to transmit the PC5-S messages, which are under protection; and one sidelink SRB may be used to transmit the PC5-RRC signaling, which is under protection. Usually, the PC5-RRC signaling is only sent after the PC5-S security has been established.

For a pair of UEs (e.g., UE 301A and UE 301C or UE 301A and UE 301B) performing unicast communication, the PC5-S connection for a UE-UE relay link and PC5-RRC connections for a UE-UE relay link may be a one-to-one mapping. In other words, each PC5-S connection for a relay link may be associated with a respective PC5-RRC connection for the relay link. A PC5-RRC signaling exchange may be started after a PC5-S initial connection setup. The RRC layer may be informed of the release of the PC5-S connection, and may release the associated PC5-RRC connection and the corresponding sidelink SRB and sidelink DRB.

Figure 4:
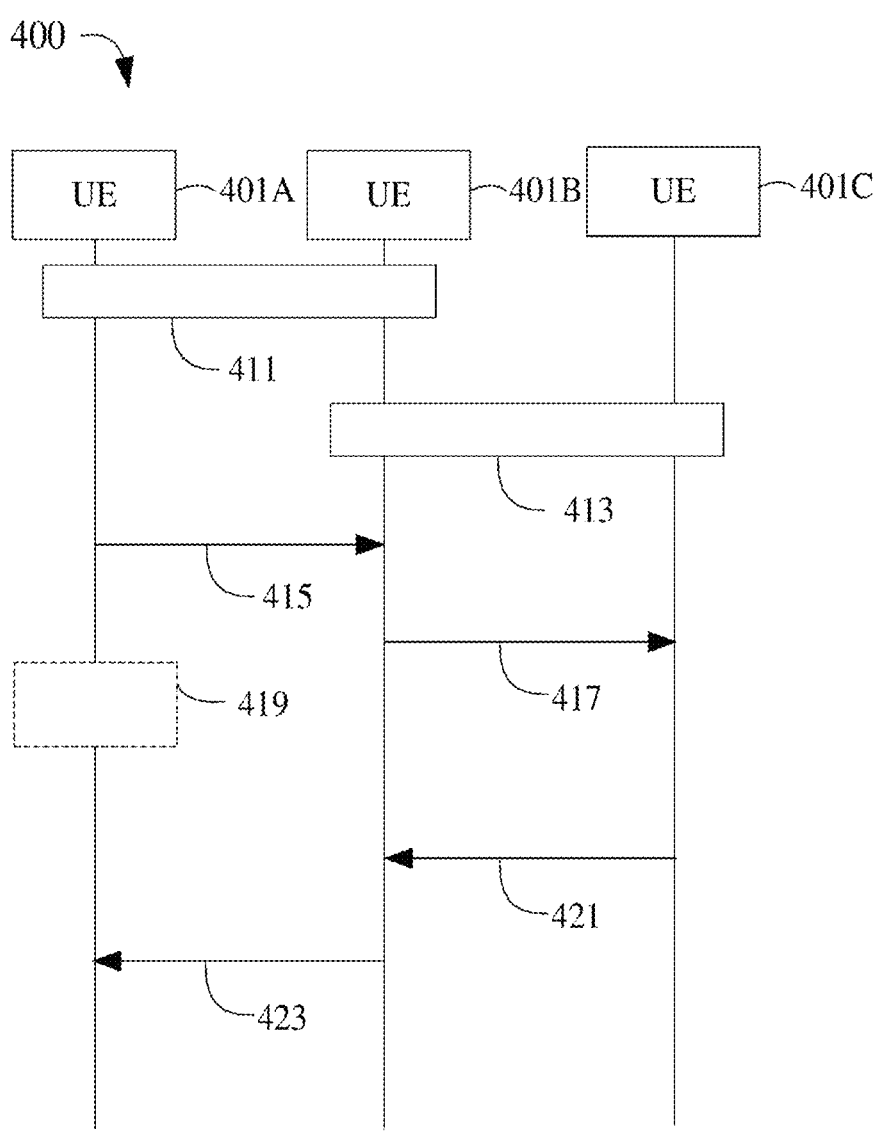
FIG. 4 illustrates an exemplary procedure for establishing a connection via a UE-to-UE relay in accordance with some embodiments of the present application.

FIG. 4 illustrates an exemplary procedure 400 for establishing connection via a UE-to-UE relay in accordance with some embodiments of the present application. Details described in all of the foregoing embodiments of the present disclosure are applicable for the embodiments shown in FIG. 4.

Referring to FIG. 4, in step 411, UE 401A is in sidelink communication with UE 401B. In other words, a PC5-RRC connection has been established between UE 401A and UE 401B. In step 413, UE 401B is in sidelink communication with UE 401C. In other words, a PC5-RRC connection has been established between UE 401B and UE 401C. Any one of UE 401A, UE 401B and UE 401C may be in-coverage or out-of-coverage.

An upper layer (i.e., a layer higher than an RRC layer in the protocol stack, such as an application layer) of UE 401A may request to establish a connection with another UE (e.g., UE 401C). However, UE 401C may not be in the neighborhood of UE 401A, and thus a direct sidelink between UE 401A and UE 401C may not be established. In this case, UE 401A (i.e., source UE) may initiate a procedure for establishing a connection with UE 401C (i.e., destination UE) via a UE-to-UE relay (e.g., UE 401B). Although a single relay node between the source UE and destination UE is depicted in FIG. 4, it is contemplated that any number of relay nodes may be included.

In some embodiments of the present disclosure, an RRC setup request establishment procedure may not be needed to establish such connection, and a relatively simple procedure may be employed. For example, a procedure similar to the above-mentioned sidelink RRC reconfiguration procedure 200 may be employed to set up the relay connection. In this scenario, a new message may be needed to distinguish whether a UE intends to establish a PC5-RRC connection or it intends to set up a relay connection. For example, an RRC reconfiguration sidelink via relay message may be employed to set up a relay connection.

In some embodiments of the present disclosure, a UE may use separate messages (e.g., an RRC reconfiguration sidelink message and an RRC reconfiguration sidelink via relay message) to establish a PC5-RRC connection and a relay connection, respectively.

For example, referring to FIG. 4, in step 415, UE 401A may transmit an RRC reconfiguration sidelink via relay message to a relay UE (e.g., UE 401B). The RRC reconfiguration sidelink via relay message may include an identity of a destination UE (e.g., UE 401C), with which UE 401A (i.e., the source UE) intends to establish a connection. The RRC reconfiguration sidelink via relay message may be delivered to the lower layers (e.g., a media access control (MAC) layer and a physical layer) of UE 401A, where the identity of UE 401A (i.e., the source UE) may be added. The RRC reconfiguration sidelink via relay message may be transmitted on a signaling radio bearer (SRB) on which an RRC reconfiguration sidelink information message is transmitted.

UE 401B (i.e., the relay UE) can recognize that different from the RRC reconfiguration sidelink message, which is used to, for example, establish the PC5-RRC connection between the UE 401A and UE 401B, the RRC reconfiguration sidelink via relay message is for setting up a relay connection. For example, UE 401B may recognize that the target or destination of the RRC reconfiguration sidelink via relay message is not UE 401B, and may find itself functioning as a relay node. In step 417, UE 401B may transmit a RRC reconfiguration sidelink via relay message to the destination UE (e.g., UE 401C). The RRC reconfiguration sidelink via relay message may include one of the identity of a destination UE (UE 401C) and the identity of the source UE (UE 401A) or both.

In response to the RRC reconfiguration sidelink via relay message, UE 401C may transmit an RRC response to UE 401B in step 421. The RRC response may include the identity of the source UE of the RRC reconfiguration sidelink via relay message as the identity of the destination UE of the RRC response. In step 423, UE 401B may transmit the RRC response to UE 401A. The RRC response may include an RRC reconfiguration complete via relay message in the case that the relay connection is successfully established. The RRC response may include an RRC reconfiguration failure via relay message in the case that the relay connection is failed.

In some embodiments of the present disclosure, instead of transmitting separate messages (e.g., an RRC reconfiguration sidelink via relay message and an RRC reconfiguration sidelink message), a UE may use the same message to establish a PC5-RRC connection and a relay connection. For example, a UE may transmit an RRC reconfiguration sidelink message to establish either a PC5-RRC connection or a relay connection. In the case of a relay connection, an RRC reconfiguration sidelink via relay message may be included in the RRC reconfiguration sidelink message.

For example, still referring to FIG. 4, in step 415, UE 401A may transmit an RRC reconfiguration sidelink message to a relay UE (e.g., UE 401B). An RRC reconfiguration sidelink via relay message and an identity of the source UE (e.g., UE 401A) of the RRC reconfiguration sidelink via relay message may be encapsulated in the RRC reconfiguration sidelink message. In some embodiments of the present disclosure, the RRC reconfiguration sidelink message may include a container, which includes the RRC reconfiguration sidelink via relay message and an identity of the source UE. In some embodiments of the present disclosure, the RRC reconfiguration sidelink message may include an identity of a destination UE (e.g., UE 401C), with which UE 401A (i.e., the source UE) intends to establish a connection.

UE 401B can recognize the target or destination of the RRC reconfiguration sidelink via relay message is not UE 401B, and does not need to decode the RRC reconfiguration sidelink message via relay message. In step 417, UE 401B may transmit the RRC reconfiguration sidelink via relay message to the destination UE (e.g., UE 401C). For example, the RRC reconfiguration sidelink via relay message may be encapsulated in another RRC reconfiguration sidelink message, which may include the container in the RRC reconfiguration sidelink message received from UE 401A. In some embodiments of the present disclosure, the another RRC reconfiguration sidelink message may include an identity of the destination UE (e.g., UE 401C), with which UE 401A (i.e., the source UE) intends to establish a connection.

In response to the RRC reconfiguration sidelink via relay message, UE 401C may transmit an RRC response to UE 401B in step 421. The RRC response may include the identity of the source UE (e.g., UE 401A) of the RRC reconfiguration sidelink via relay message as the identity of the destination UE of the RRC response. In step 423, UE 401B may transmit the RRC response to a corresponding UE (e.g., UE 401A). The RRC response may include an RRC reconfiguration complete via relay message or an RRC reconfiguration failure via relay message, depending on whether the relay connection is successfully established or not.

For example, in step 421, UE 401C may transmit to UE 401B RRC reconfiguration complete sidelink message #1 (or RRC reconfiguration failure sidelink message #1), which may encapsulate the RRC reconfiguration complete via relay message (or the RRC reconfiguration failure via relay message). The identity of UE 401C may also be encapsulated in RRC reconfiguration complete sidelink message #1 (or RRC reconfiguration failure sidelink message #1). RRC reconfiguration complete sidelink message #1 (or RRC reconfiguration failure sidelink message #1) may include the identity of UE 401A.

In step 423, UE 401B may transmit to UE 401A RRC reconfiguration complete sidelink message #2 (or RRC reconfiguration failure sidelink message #2), which may encapsulate the RRC reconfiguration complete via relay message (or the RRC reconfiguration failure via relay message). The identity of UE 401C may be encapsulated in RRC reconfiguration complete sidelink message #2 (or RRC reconfiguration failure sidelink message #2). RRC reconfiguration complete sidelink message #2 (or RRC reconfiguration failure sidelink message #2) may include the identity of UE 401A.

In some embodiments of the present disclosure, in response to transmitting the RRC reconfiguration sidelink via relay message, UE 401A may start a timer (Timer A) to control the establishment procedure of the relay connection. Timer A is different from the one (e.g., T400) used to control the sidelink RRC reconfiguration procedure. UE 401A may stop Timer A in response to receiving a response (e.g., an RRC reconfiguration complete via relay message or an RRC reconfiguration failure via relay message) to the RRC reconfiguration sidelink via relay message. In response to the expiry of Timer A or the reception of the RRC reconfiguration failure sidelink via relay message, UE 401A may consider that a failure has occurred on the radio link.

In some embodiments of the present disclosure, in response to the expiry of Timer A or the reception of the RRC reconfiguration failure sidelink via relay message, UE 401A may wait for a certain time period before transmitting another RRC reconfiguration sidelink via relay message via the original relay UE (e.g., UE 401B) or a different UE (not shown in FIG. 4).

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
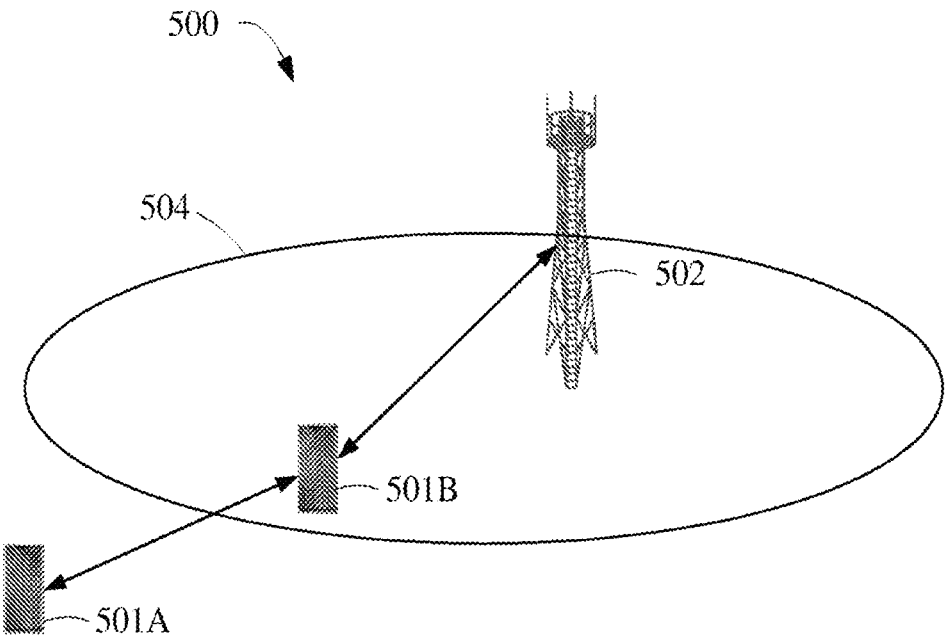
FIG. 5 illustrates a schematic diagram of a wireless communication system in accordance with some embodiments of the present application.

FIG. 5 illustrates a schematic diagram of a wireless communication system 500 in accordance with some embodiments of the present application.

As shown in FIG. 5, the wireless communication system 500 may include one BS (e.g., BS 502) and some UEs (e.g., UE 501A and UE 301B). Although a specific number of UEs and BS are depicted in FIG. 5, it is contemplated that any number of UEs may be included in the wireless communication system 500.

Referring to FIG. 5, UE 501B may be within the coverage of BS 502, and UE 501A may be out-of-coverage. In some examples, UE 501B may function as UE 101A or UE 101B shown in FIG. 1, and UE 501A may function as UE 101C shown in FIG. 1.

The wireless communication system 500 may support sidelink communications. For example, UE 501B may be in sidelink communication with UE 501A. In some embodiments of the present disclosure, UE 501A may initiate a procedure for establishing connection with BS 502 via UE 501B (i.e., UE-to-network relay). More details on such procedure will be illustrated in the following text. After such procedure, UE 501A may access BS 502 via UE 501B. UE 501A and BS 502 may establish an RRC connection therebetween, and UE 501A may have RRC states, such as an RRC_IDLE state, an RRC_INACTIVE state, and an RRC_CONNECTED state.

Figure 6:
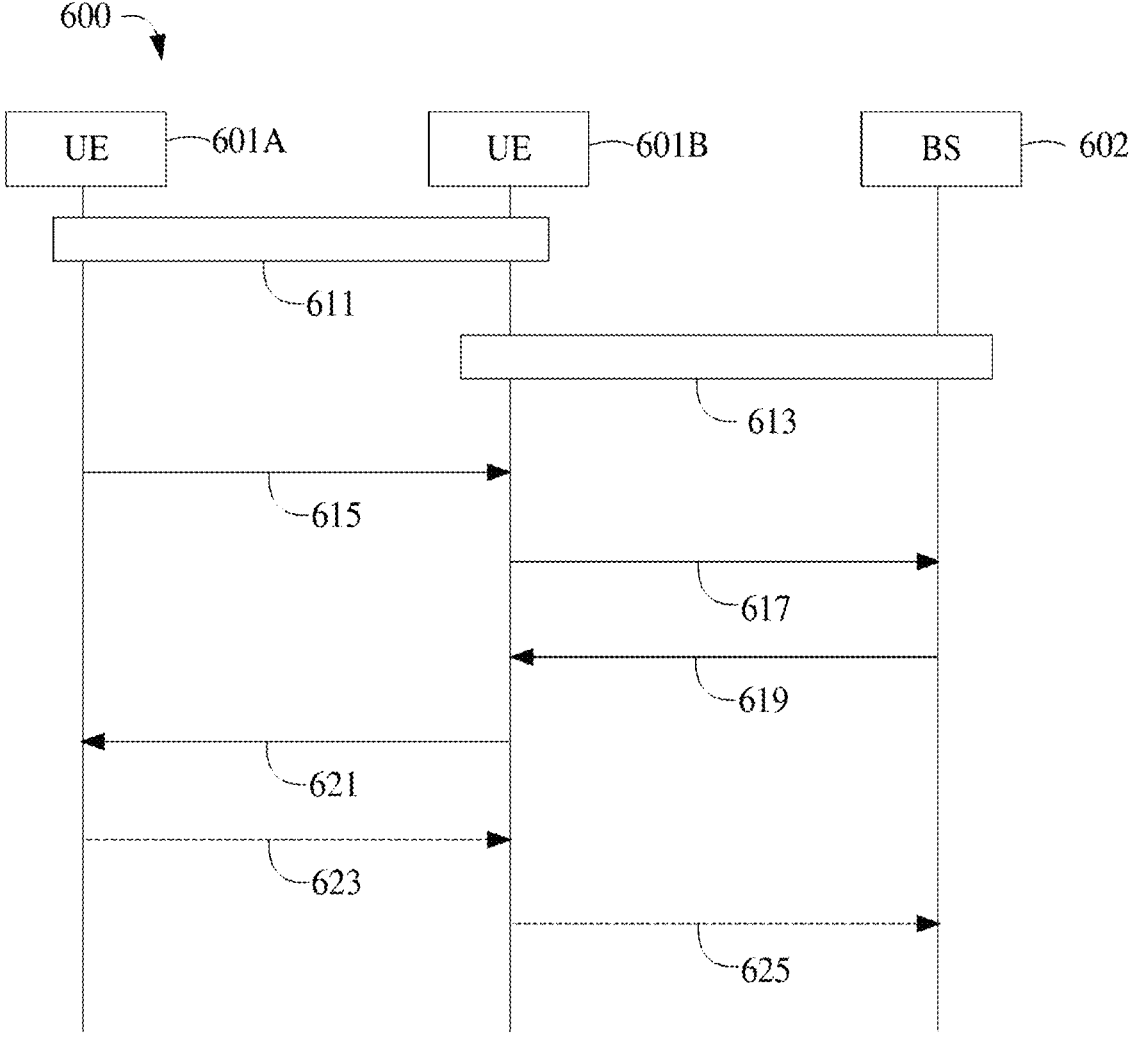
FIG. 6 illustrates an exemplary procedure for establishing a connection via a UE-to-network relay in accordance with some embodiments of the present application.

FIG. 6 illustrates an exemplary procedure 600 for establishing connection via a UE-to-network relay in accordance with some embodiments of the present application. Details described in all of the foregoing embodiments of the present disclosure are applicable for the embodiments shown in FIG. 6. The procedure 600 may also be applied to the UE-to-UE relay scenario. For example, a UE may use the procedure 600 to establish a connection with another UE via a UE-to-UE relay.

Referring to FIG. 6, in step 611, UE 601A is in sidelink communication with UE 601B. In other words, a PC5-RRC connection has been established between UE 601A and UE 601B. In step 613, UE 601B is accessing BS 602. In other words, a Uu-RRC connection has been established between UE 601B and BS 602.

UE 601A may want to access a BS so as to, for example, reach a server in the PDN network. However, UE 601A is outside the coverage of any BS. In this case, UE 601A (i.e., source UE or remote UE) may initiate a procedure for establishing a connection with a BS (e.g., BS 602) via a UE-to-network relay (e.g., UE 601B). Although a single relay node between the source UE and the BS is depicted in FIG. 6, it is contemplated that any number of relay nodes may be included.

For example, referring to FIG. 6, in step 615, UE 601A may transmit a RRC setup request message to UE 601B. In some embodiments of the present disclosure, the RRC setup request message may include an initial UE identity (e.g., ng-5G-S-TMSI-Part1) and an establishment cause (e.g., "emergency," "highPriorityAccess," "mt-Access," "mo-Signalling," "mo-Data," "mo-VoiceCall," "mo-VideoCall," "mo-SMS," "mps-PriorityAccess," "mcs-PriorityAccess.") In some embodiments of the present disclosure, the RRC setup request message may include the identity of UE 601A, which may be a 5G S-Temporary Mobile Subscription Identifier (5G-S-TMSI), a layer-2 identity or a reduced layer-2 identity. An upper layer (i.e., a layer higher than an RRC layer) of a UE may designate a layer-2 identity of the UE, which may include 24 bits. As mentioned above, the identity of UE 601A in the RRC setup request message may include a reduced layer-2 identity, which may include a part (e.g., 10 bits) of the 24 bits layer-2 UE ID.

In some embodiments of the present disclosure, the RRC setup request message may indicate its target or destination. In some examples, the RRC setup request message may indicate whether it is used for setup a relay connection via a UE-to-network relay or a UE-to-UE relay. For example, the RRC setup request message may include an indicator indicating that the destination of the RRC setup request message is either a UE or a BS. In some instances, the indicator may indicate an identity of the destination UE, an identity of a BS (e.g., a cell ID of the BS), or predefined values indicating that the destination of the RRC setup request message is either a UE or a BS. In some examples, the RRC setup request message may not include an explicit indictor to indicate its destination, which may suggest that the destination of the RRC setup request message is a BS.

In the exemplary procedure shown in FIG. 6, the destination of the RRC setup request message is a BS (e.g., BS 602). The RRC setup request message transmitted by UE 601A may include an explicit indicator as described above to indicate that the destination of the RRC setup request message is a BS or does not include an explicit indicator. After receiving the RRC setup request message from UE 601A, UE 601B may recognize that the RRC setup request message is targeted to a BS. In the exemplary procedure shown in FIG. 6, UE 601B is in-coverage, so UE 601B may transmit the RRC setup request message to its serving BS (e.g., BS 602) in step 617. In some other examples, UE 601B may be out-of-coverage, and the RRC setup request message may hop through more than one relay node before it reaches a BS.

Still referring to FIG. 6, in some examples, UE 601B may forward the RRC setup request message from UE 601A to BS 602. In some other examples, UE 601B may transmit to BS 602 another RRC setup request message based on the RRC setup request message from UE 601A. The another RRC setup request message may include the identity of the remote UE (UE 601A) as indicated in the RRC setup request message from UE 601A.

In some embodiments of the present disclosure, UE 601B may forward or transmit the RRC setup request message to BS 602 on signaling radio bearer 1 (SRB1) or signaling radio bearer 2 (SRB2). In some embodiments of the present disclosure, UE 601B may connect to an MN (e.g., BS 602) and an SN (not shown in FIG. 6). In the case that a MCG failure occurs at UE 601B, UE 601B may forward or transmit the RRC setup request message on signaling radio bearer 3 (SRB3). That is, the RRC setup request message may be transmitted to the SN on SRB3, which may forward it to the MN (e.g., BS 602) via an Xn interface.

After receiving the RRC setup request message, BS 602 may respond to it, and may also need to configure a bear mapping to the relay UE (i.e., UE 601B). In step 619, in response to the RRC setup request message, BS 602 may transmit a RRC reconfiguration message to UE 601B. The RRC reconfiguration message may include the bearer mapping information for the relay UE (i.e., UE 601B) and a response message to the source UE (i.e., UE 601A) of the RRC setup request message. The RRC reconfiguration message may also include the identity of UE 601A since the bearer mapping information and the response message is UE specific. In some embodiments of the present disclosure, the response message may be encapsulated in the RRC reconfiguration message. For example, the RRC reconfiguration message may include a container, which includes the response message.

In some embodiments of the present disclosure, BS 602 may receive more than one RRC setup request message via the relay UE 601B. In these embodiments, the RRC reconfiguration message transmitted from BS 602 to UE 601B may include more than one response message. For example, beside UE 601A, UE #4 (not shown in FIG. 6) may also transmit an RRC setup request message to BS 602 via UE 601B. The RRC reconfiguration message transmitted from BS 602 to UE 601B may include a response message to UE 601A and a response message to UE #4. The RRC reconfiguration message may also include mapping information associated with UE 601A and UE #4 for UE 601B and the identities of UE 601A and UE #4.

UE 601B may configure the bearers between UE 601B and BS 602 and the bearers between UE 601B and UE 601A according to the mapping information in the RRC reconfiguration message. In step 621, UE 601B may transmit the response message included (e.g., encapsulated) in the RRC reconfiguration message to the corresponding UE (e.g., UE 601A). In some embodiments of the present disclosure, the response message may be an RRC setup response message. In these embodiments, in response to the response message, UE 601A may transmit an RRC setup complete message to the BS 602 via the relay UE 601B. The RRC setup complete message may include the identity of UE 601A (i.e., the source UE of the RRC setup complete message). For example, in step 623 (denoted by dotted arrow as an option), UE 601A may transmit the RRC setup complete message to UE 601B. In step 625 (denoted by dotted arrow as an option), UE 601B may forward the RRC setup complete message to BS 602.

In some embodiments of the present disclosure, the response message may be a rejection message. The rejection message may indicate a time period. UE 601A may wait for the time period before transmitting another RRC setup request message to the BS via the new relay UE.

It should be appreciated by persons skilled in the art that the sequence of the operations in exemplary procedure 600 may be changed and some of the operations in exemplary procedure 600 may be eliminated or modified, without departing from the spirit and scope of the disclosure. For example, in the case that a UE uses the procedure 600 to establish a connection with another UE via a UE-to-UE relay, the RRC setup complete message transmitted from the UE to the another UE may include the identity of the another UE.

Figure 7:
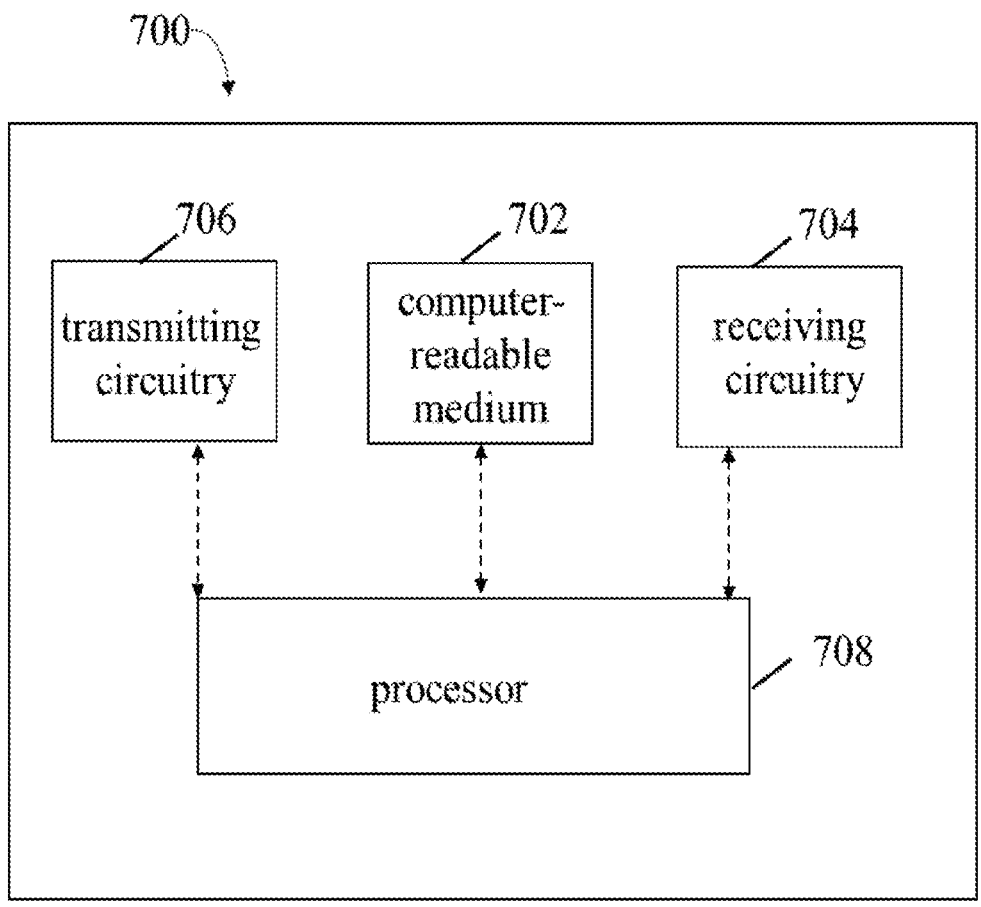
FIG. 7 illustrates a block diagram of an exemplary apparatus in accordance with some embodiments of the present disclosure.

FIG. 7 illustrates an example block diagram of an apparatus 700 according to some embodiments of the present disclosure. The apparatus 700 may be a BS or a UE.

Referring to FIG. 7, the apparatus 700 may include at least one non-transitory computer-readable medium 702, at least one receiving circuitry 704, at least one transmitting circuitry 706, and at least one processor 708. In some embodiment of the present application, at least one receiving circuitry 704 and at least one transmitting circuitry 706 and be integrated into at least one transceiver. The at least one processor 708 may be coupled to the at least one non-transitory computer-readable medium 702, the at least one receiving circuitry 704 and the at least one transmitting circuitry 706. In some embodiments of the present disclosure, the apparatus 700 may further include an input device, a memory, and/or other components.

In some embodiments of the present disclosure, the at least one non-transitory computer-readable medium 702 may have stored thereon computer-executable instructions to cause the at least one processor 708 to implement the operations, steps, or methods with respect to the UEs as described above.

For example, the computer-executable instructions, when executed, cause the at least one processor 708 interacting with the at least one receiving circuitry 704 and the at least one transmitting circuitry 706, so as to perform the steps with respect to the UEs depicted in FIGS. 1-6.

In some examples, the at least one transmitting circuitry 706 may transmit an RRC reconfiguration sidelink via relay message on a sidelink. The at least one processor 708 may start a timer in response to the transmission of the RRC reconfiguration sidelink via relay message. The at least one receiving circuitry 704 may receive an RRC reconfiguration complete sidelink via relay message or an RRC reconfiguration failure sidelink via relay message in response to the RRC reconfiguration sidelink via relay message. The at least one processor 708 may stop the timer in response to the reception of the RRC reconfiguration complete sidelink via relay message or the RRC reconfiguration failure sidelink via relay message.

In some embodiments of the present disclosure, the at least one non-transitory computer-readable medium 702 may have stored thereon computer-executable instructions to cause the at least one processor 708 to implement the operations, steps, or methods with respect to the BSs as described above. For example, the computer-executable instructions, when executed, cause the at least one processor 708 interacting with the at least one receiving circuitry 704 and the at least one transmitting circuitry 706, so as to perform the steps with respect to the BSs depicted in FIGS. 1 and 4-6.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a first user equipment (UE), the method comprising:

transmitting a radio resource control (RRC) setup request message on a sidelink between the first UE and a second UE, wherein the RRC setup request message comprises an identity of the first UE;

starting, based at least in part on transmitting the RRC setup request message, a timer to control establishment of a relay connection between the first UE and the second UE;

receiving, responsive to the RRC setup request message, an RRC setup response message;

stopping the timer based at least in part on receiving the RRC setup response message; and transmitting an RRC setup complete message, wherein one or more bearers between the second UE and a plurality of UEs comprising the first UE are configured based at least in part on an RRC reconfiguration message between a base station (BS) and the second UE.

2. The method of claim 1, wherein a destination of the RRC setup request message is the BS based at least in part on the RRC setup request message failing to indicate the destination of the RRC setup request message.

3. The method of claim 1, wherein the RRC setup request message indicates that a destination of the RRC setup request message is either a third UE or the BS.

4. The method of claim 1, wherein the RRC setup response message is received based at least in part on a destination of the RRC setup request message being the BS, and wherein the RRC setup complete message comprises the identity of the first UE.

5. The method of claim 1, wherein the identity of the first UE is a 5G S-Temporary Mobile Subscription Identifier (5G-S-TMSI), a layer-2 identity, or a reduced layer-2 identity.

6. A method performed by a second user equipment (UE), the method comprising:

receiving a plurality of radio resource control (RRC) setup request messages on respective sidelinks between a plurality of first UEs and the second UE, wherein the plurality of RRC setup request messages comprises respective identities of the plurality of first UEs;

transmitting, to a base station (BS), the plurality of RRC setup request messages;

receiving, from the BS and responsive to the plurality of RRC setup request messages, an RRC reconfiguration message configuring one or more respective bearers between the plurality of first UEs and the second UE; and transmitting, to the plurality of first UEs, respective RRC setup response messages based at least in part on the RRC reconfiguration message, wherein a timer to control establishment of a relay connection between the plurality of first UEs and the second UE is started based at least in part on the plurality of RRC setup request messages and is stopped based at least in part on the respective RRC setup response messages.

7. The method of claim 6, wherein the respective identities of the plurality of first UEs comprise at least one of a 5G S-Temporary Mobile Subscription Identifier (5G-S-TMSI), a layer-2 identity, or a reduced layer-2 identity.

8. The method of claim 6, wherein a destination of respective RRC setup request messages of the plurality of RRC setup request messages is the BS based at least in part on the respective RRC setup request messages failing to indicate the destination.

9. The method of claim 6, wherein respective RRC setup request messages of the plurality of RRC setup request messages indicate that a destination of the respective RRC setup request messages is either a third UE or the BS.

10. The method of claim 6, wherein respective RRC setup request messages of the plurality of RRC setup request messages are transmitted based at least in part on a destination of the respective RRC setup request messages being the BS, the method further comprises:

receiving, from the plurality of first UEs, respective RRC setup complete messages; and transmitting, to the BS, the respective RRC setup complete messages, wherein the respective RRC setup complete messages comprise the respective identities of the plurality of first UEs.

11. The method of claim 6, wherein the RRC reconfiguration message comprises the respective identities of the plurality of first UEs, and wherein the respective RRC setup response messages are encapsulated in the RRC reconfiguration message.

12. A method performed by a base station (BS), the method comprising:

receiving, from a second user equipment (UE), a plurality of radio resource control (RRC) setup request messages comprising respective identities of a plurality of first UEs; and transmitting, to the second UE and responsive to the plurality of RRC setup request messages, an RRC reconfiguration message configuring one or more respective bearers between the plurality of first UEs and the second UE, wherein a timer to control establishment of a relay connection between the plurality of first UEs and the second UE is started based at least in part on the plurality of RRC setup request messages and is stopped based at least in part on respective RRC setup response messages associated with the plurality of first UEs.

13. The method of claim 12, wherein the respective identities of the plurality of first UEs comprise at least one of a 5G S-Temporary Mobile Subscription Identifier (5G-S-TMSI), a layer-2 identity or a reduced layer-2 identity.

14. The method of claim 12, wherein the plurality of RRC setup request messages is received on a signaling radio bearer 1 (SRB1) or a signaling radio bearer 2 (SRB2), or wherein the plurality of RRC setup request messages is received via an additional BS serving the second UE based at least in part on a master cell group (MCG) failure occurring on a link between the second UE and the additional BS.

15. The method of claim 12, wherein the RRC reconfiguration message comprises the respective identities of the plurality of first UEs, and wherein a plurality of RRC setup response messages is encapsulated in the RRC reconfiguration message.

16. The method of claim 12, wherein the plurality of RRC setup request messages is received based at least in part on a destination of respective RRC setup request messages of the plurality of RRC setup request messages being the BS, and wherein the method further comprises receiving a plurality of RRC setup complete messages, wherein the plurality of RRC setup complete messages comprises the respective identities of the plurality of first UEs.

17. A first user equipment (UE) for wireless communication, comprising:

at least one memory; and at least one processor configured with the at least one memory and operable to cause the first UE to:

transmit a radio resource control (RRC) setup request message on a sidelink between the first UE and a second UE, wherein the RRC setup request message comprises an identity of the first UE;

start, based at least in part on transmitting the RRC setup request message, a timer to control establishment of a relay connection between the first UE and the second UE;

receive, responsive to the RRC setup request message, an RRC setup response message;

stop the timer based at least in part on receiving the RRC setup response message; and transmit an RRC setup complete message, wherein one or more bearers between the second UE and a plurality of UEs comprising the first UE are configured based at least in part on an RRC reconfiguration message between a base station (BS) and the second UE.

18. The first UE of claim 17, wherein a destination of the RRC setup request message is the BS based at least in part on the RRC setup request message failing to indicate the destination of the RRC setup request message.

19. The first UE of claim 17, wherein the RRC setup request message indicates that a destination of the RRC setup request message is either a third UE or the BS.

20. The first UE of claim 17, wherein an expiry of the timer indicates a radio link failure (RLF) associated with the relay connection between the first UE and the second UE.

* * * * *